United States Patent Office 3,655,794
Patented Apr. 11, 1972

3,655,794
RECOVERY OF CRUDE CIS,TRANS,TRANS-CYCLODODECATRIENE - 1,5,9 HAVING A LOW CHLORINE CONTENT
Hanns Strache and Rolf Dammermann, Marl, Germany, assignors to Chemische Werke Huels A.G., Marl, Germany
No Drawing. Filed Mar. 21, 1969, Ser. No. 809,420
Claims priority, application Germany, Mar. 28, 1968,
P 17 68 067.0
Int. Cl. C07c *1/00*
U.S. Cl. 260—666 B       13 Claims

ABSTRACT OF THE DISCLOSURE

To lower the content of chlorine-containing by-products in the crude cis,trans,trans-cyclododecatriene-1,5,9 obtained from the trimerization of 1,3-butadiene in the presence of titanium halogenides and alkyl aluminum halides in an inert solvent, after the trimerization is completed, there is added ammonia which suppresses the formation of chlorine-containing compounds, and thereafter water which results in the catalyst residue precipitating in large granules, facilitating a decanting or filtration step.

BACKGROUND OF THE INVENTION

This invention relates to an improved process for the recovery of cis,trans,trans - cyclododecatriene - 1,5,9 from its synthesis medium.

It is known that cis,trans,trans-cyclododecatriene-1,5,9 can be synthesized from 1,3-butadiene in the presence of a mixture of titanium halides and alkyl-aluminum halides in solvents (German Pat. 1,050,333). It is further known that the catalyst residue can be precipitated after the trimerization step by the addition of compounds containing active hydrogen, such as alcohols and/or water. In some cases the resulting solvent layer is then subjected to steam distillation, and in any event is ultimately subjected to rectification to remove higher and lower boiling impurities.

In the above process, during the precipitation of the catalyst residue, chlorine-containing compounds are left in the crude product, so that after catalyst separation, the crude cyclododecatriene usually contains 250 to 800 p.p.m. of chlorine in the form of chlorine-containing, organic compounds, such as chlorinated cyclododecatriene-1,5,9.

Because of this relatively high chlorine content in the crude product, difficulties arise during distillation. Hydrogen chloride is formed and, owing to the small differences between the boiling points of cyclododecatriene and chlorinated cyclododecatriene, the investment and operating costs for the distillation step are unusually high. This problem is even more severe in cases where the trimerization is conducted in the presence of small amounts of water for the purpose of increasing the space-time yield (German application C 42 534 IVb/12 o).

To attempt to overcome this problem by suppressing the undesired formation of chlorine-containing reaction products, acetone has been added (in the optional presence of small amounts of pyridine) after the synthesis, but before the fractionation of the catalyst (German published application 1,212,075). This method, however, is not very amenable to large scale operations, since small amounts of acetone remain in the recycled solvent, precluding its re-use for the trimerization.

SUMMARY OF THE INVENTION

An object of this invention, therefore, is to provide a process for the recovery of crude cis,trans,trans-cyclododecatriene-1,5,9 having a lower chlorine-containing concentration, and which avoids the use of acetone.

Another object of this invention is to provide an improved process for the separation of the catalyst residue from the trimerization medium in the production of cis,trans,trans-cyclododecatriene-1,5,9 whereby the catalyst residue is precipitated in granular form, facilitating its separation by decantation, filtration or the like.

Still another object of this invention is to provide a process for the recovery of crude cyclododecatriene-1,5,9, whereby water is added to the trimerization medium after the reaction, resulting in water concentrations in the solvent which is to be recycled to a fresh reaction, thus obtaining the benefits of an improved space-time yield in said fresh reaction.

Upon further study of the specification and appended claims, additional objects and advantages of this invention will become apparent.

To attain the above objects, ammonia is added to the trimerization medium in an amount of 1-10, preferably 2-4 times the molar quantity of the catalyst components employed. This ammonia suppresses the formation of chlorine-containing organic by-products. In addition to ammonia, there can also be added water or an aqueous alkaline solution. The addition of water results in the formation of a granular precipitate of the catalyst residue, and the addition of an aqueous alkaline solution results in a re-dissolution of the catalyst residue precipitate, thereby forming an aqueous phase which can be easily decanted from the organic phase of the trimerization medium.

DETAILED DISCUSSION OF THE INVENTION

The trimerization reaction itself, conducted in the presence of a titanium halide, such as titanium tetrachloride, and an aluminum halogenide, such as aluminum sesquichloride in the presence of an inert solvent, such as benzene, is usually conducted for about 30 to 120 minutes at approximately 60 to 90° C. To terminate the reaction, the ammonia is added preferably in the form of a 10% to 25% by weight aqueous solution.

It is preferable for the reaction with ammonia to take place for about 5 to 30 minutes at about 60 to 80 degrees C., but it is to be appreciated that these operating conditions are directed to the optimum operation of applicants' process.

It is very beneficial to add water in approximately a 1–3 molar quantity (based on $NH_3$), during or preferably after the above preferred operating time for the ammonia reaction. In this way, the catalyst precipitate precipitates in a granular shape, thereby facilitating separation by decantation, filtration or the like. If this amount of water is not added, the catalyst residue precipitates as a bulky fine particles size sludge, resulting in a relatively difficult filtration step.

As an alternative to the use of water in order to facilitate catalyst separation, it is possible to add an aqueous alkaline solution of sufficient strength which will dissolve the precipitate, thereby forming an aqueous layer in the trimerization reaction medium. As an example of such an alkaline solution, 20–25% by weight aqueous sodium hydroxide can be employed, there being many equivalent alkaline solutions which will immediately occur to the chemist of ordinary skill. In general, it is necessary to employ such a solution in a quantity of 3–10 times the molar quantity of $NH_3$ added to the reaction medium.

With all three operating methods there is obtained a completely clear raw product with chlorine values of less than 30 p.p.m. on a weight basis referring to the crude cyclododecatriene-1,5,9. After the removal of the solvent, these crudes yield pure cyclododecatriene with chlorine contents of only about 5 p.p.m., without an expensive

Example 1-A 6.2 g. (50 mmol) of Al-sesquichloride and 0.19 g. (1 mmol) titanium tetrachloride are dissolved in 500 g. benzene at 60° C. with agitation, and within a period of 60 to 70 minutes there is aded 500 g. 1,3-butadiene while maintaining the reaction temperature at 70° C. Immediately after said period, there is added 10 ml. of concentrated ammonia solution containing 25% by weight $NH_3$, and after a further 5 minutes, 20 ml. of water. After the agitation is terminated, the precipitate is deposited immediately. The water-clear crude cyclododecatriene is decanted off and subsequently distilled. There is thus obtained, without fractionation, a pure cyclododecatriene having a chlorine content of only about 5 p.p.m. After the separation, the resulting benzene has a low water concentration (about 200 to 300 p.p.m.). This benzene can be recycled without further purification, as solvent for the trimerization reaction of butadiene.

Example 1-B

If the addition of water is omitted, there is obtained in the benzene a water content of only 50 to 100 p.p.m. The precipitate, however, is fine and voluminous and filtration is unavoidable.

Example 2

Example 1 is repeated, however, instead of water there is added 50 ml. of 20% by weight aqueous sodium hydroxide solution. There is then obtained a clear, watery bottom layer, which can be easily separated off.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for the production of crude cis,trans,trans-cyclododecatriene-1,5,9 from the trimerization of 1,3-butadiene in the presence of a catalyst of titanium tetrachloride and aluminum halogenide in an inert solvent, the improvement comprising adding to the liquid reaction product at the termination of the trimerization step aqueous ammonia in 1–10 times the molar quantity of the catalyst employed, whereby byproduct formation of chlorine-containing organic compounds is suppressed, and residual catalyst is precipitated as a bulky fine particle size sludge or a granular precipitate.

2. A process as defined by claim 1, wherein the ammonia is added in an amount of 2–4 times the molar amount of the catalyst.

3. A process as defined by claim 1, wherein during or after said ammonia addition, the further step of adding water to the liquid reaction product in a quantity of 1–3 times the molar quantity of ammonia added, thereby resulting in the formation of a granular precipitate of catalyst residue.

4. A process as defined by claim 11, wherein during or after said ammonia addition, the further step of adding water to the liquid reaction product in a quantity of 1–3 times the molar quantity of ammonia added, thereby resulting in the formation of a granular precipitate of catalyst residue.

5. A process as defined by claim 1, comprising the further step of adding to resultant suspension an aqueous alkaline solution having a sufficient strength to dissolve precipitated catalyst residue, the molar quantity of said solution being approximately 3–10 times the ammonia added, thereby resulting in the formation of an easily separable aqueous layer in the trimerization medium.

6. A process as defined by claim 12, comprising prior to said separating the further step of adding an aqueous alkaline solutions having a sufficient strength to dissolve precipitated catalyst residue, the molar quantity of said solution being approximately 3–10 times the ammonia added, thereby resulting in the formation of an easily separable aqueous layer in the trimerization medium.

7. A urocess as defined by claim 1, wherein said ammonia is added in the form of 10 to 25% by weight aqueous ammonia solution.

8. A process as defined by claim 12, wherein said ammonia is added in the form of 10 to 25% by weight aqueous ammonia solution.

9. A process as defined by claim 3, wherein said ammonia is added in the form of 10 to 25% by weight aqueous ammonia solution.

10. A process as defined by claim 4, wherein said ammonia is added in the form of 10 to 25% by weight aqueous ammonia solution.

11. A process as defined by claim 1, wherein the aqueous ammonia is reacted for 5–30 minutes at 60–80° C.

12. A process as defined by claim 1, further comprising separating resultant catalyst residue from the reaction product, and subsequently distilling resultant reaction product, there being no vaporization of the reaction product prior to said distilling.

13. A process as defined by claim 12, further comprising prior to separating the catalyst residue from the reaction product during or after said amomnia addition, the further step of adding water to the liquid reacting product in a quantity of 1–3 times the molar quantity of ammonia added, thereby resulting in the formation of a granular precipitate of catalyst residue.

References Cited

UNITED STATES PATENTS

| | | | |
|---|---|---|---|
| 3,157,708 | 11/1964 | Munley | 260—666 B |
| 3,239,574 | 3/1966 | Austin | 260—666 B |
| 3,149,174 | 9/1964 | Mueller | 260—666 B |
| 3,214,484 | 10/1965 | Wittenberg | 260—666 B |
| 3,365,507 | 1/1968 | Rike | 260—666 B |
| 3,420,899 | 11/1969 | Longiave | 260—666 B |

DELBERT E. GANTZ, Primary Examiner

V. O. KEEFE, Assistant Examiner